(12) United States Patent
Suesada et al.

(10) Patent No.: US 10,926,613 B2
(45) Date of Patent: Feb. 23, 2021

(54) AUTOMOBILE DOOR SASH STRUCTURE

(71) Applicant: HONDA MOTOR CO., LTD., Tokyo (JP)

(72) Inventors: Ryo Suesada, Wako (JP); Masatoshi Mori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 89 days.

(21) Appl. No.: 16/383,384

(22) Filed: Apr. 12, 2019

(65) Prior Publication Data

US 2019/0315214 A1    Oct. 17, 2019

(30) Foreign Application Priority Data

Apr. 13, 2018    (JP) .............................. JP2018-077407

(51) Int. Cl.
| | |
|---|---|
| *B60J 10/235* | (2016.01) |
| *B60J 10/27* | (2016.01) |
| *B60J 10/76* | (2016.01) |

(52) U.S. Cl.
CPC ............. *B60J 10/235* (2016.02); *B60J 10/27* (2016.02); *B60J 10/76* (2016.02)

(58) Field of Classification Search
None
See application file for complete search history.

(56) References Cited

FOREIGN PATENT DOCUMENTS

| | | | |
|---|---|---|---|
| JP | H02-107517 U | | 8/1990 |
| JP | H11-129750 A | | 5/1999 |
| JP | 2005336360 A | * | 12/2005 |
| JP | 3869260 B2 | | 1/2007 |

OTHER PUBLICATIONS

Japanese Office Action received in corresponding JP application No. 2018-077407 dated Oct. 1, 2019 (3 pages). English translation is not available.

* cited by examiner

*Primary Examiner* — Lori L Lyjak
(74) *Attorney, Agent, or Firm* — Rankin, Hill & Clark LLP

(57) ABSTRACT

The automobile door sash structure includes a mall assembly body including a mall and a run channel which are assembled into a single unit. The run channel includes: an inner wall part which forms the inner wall of a rail part in collaboration with a window frame main body; and a bottom part which forms a bottom portion of the rail part in collaboration with the window frame main body. A total dimension of a dimension of the inner wall part in a frame inside-outside direction and a dimension of the bottom part in a vehicle inside-outside direction is set longer than a dimension of the window frame main body in the frame inside-outside direction.

2 Claims, 7 Drawing Sheets

AUTOMOBILE DOOR SASH STRUCTURE

BACKGROUND OF THE INVENTION

1. Field of the Invention

The present invention relates to an automobile door sash structure including a run channel which seals the interstice between a door sash and a window glass.

2. Description of the Related Art

A run channel has been conventionally arranged in a door sash to seal the interstice between the door sash and a window glass.

For example, Japanese Patent No. 3869260 (Patent Document 1) discloses a rail part with a substantially U-shaped cross-section which surrounds the outer edge of a window glass when the window glass is closed, and which includes a window frame and an outer wall which is formed from a mall separate from and attachable to the window frame. The mall is attached to the window frame to form the rail part with the substantially U-shaped cross-section and then the run channel is arranged inside the rail part.

SUMMARY OF THE INVENTION

The sash structure disclosed in Patent Document 1, however, involves a problem that the mall and the run channel are different parts, which complicates the attaching work and requires many man-hours.

The present invention has been made with the above taken into consideration. An object of the present invention is to provide an automobile door sash structure which makes it possible to attach a mall and a run channel to a window frame by simple work without needing many man-hours.

For the purpose of achieving the above object, an automobile door sash structure according to the present invention includes: a window glass arranged inside a window frame; a rail part forming a part of the window frame, and surrounding an outer edge of the window glass; a mall forming a part of an outer wall of the rail part; a window frame main body forming a part of an inner wall of the rail part; a run channel arranged inside the rail part; and a mall assembly body including the mall and the run channel which are formed into a single unit. The automobile door sash structure is characterized in that: the run channel includes an inner wall part which forms the inner wall of the rail part in collaboration with the window frame main body, and a bottom part which forms a bottom portion of the rail part in collaboration with the window frame main body; and a total dimension of a dimension of the inner wall part in a frame inside-outside direction and a dimension of the bottom part in a vehicle inside-outside direction is set longer than a dimension of the window frame main body in the frame inside-outside direction.

This configuration makes it possible to attach the mall and the run channel in a single step of attaching the mall assembly body to the window frame main body. The configuration further makes it possible to correctly assemble the mall and the run channel together by only an action of pressing the run channel in the same direction as the mall is attached, while preventing a part of the run channel from unexpectedly getting caught.

Thereby, the mall and the run channel can be attached to the window frame by the simple work without needing many man-hours.

The present invention can provide an automobile door sash structure which makes it possible to attach a mall and a run channel to a window frame with the simple work without needing many man-hours.

DETAILED DESCRIPTION OF THE EMBODIMENTS

Embodiments of the present invention will be hereinafter described in detail with reference to the accompanying drawings depending on the necessity.

To begin with, descriptions will be provided for a vehicle S in which an automobile door sash structure 1 according to an embodiment is installed.

Figure 1:
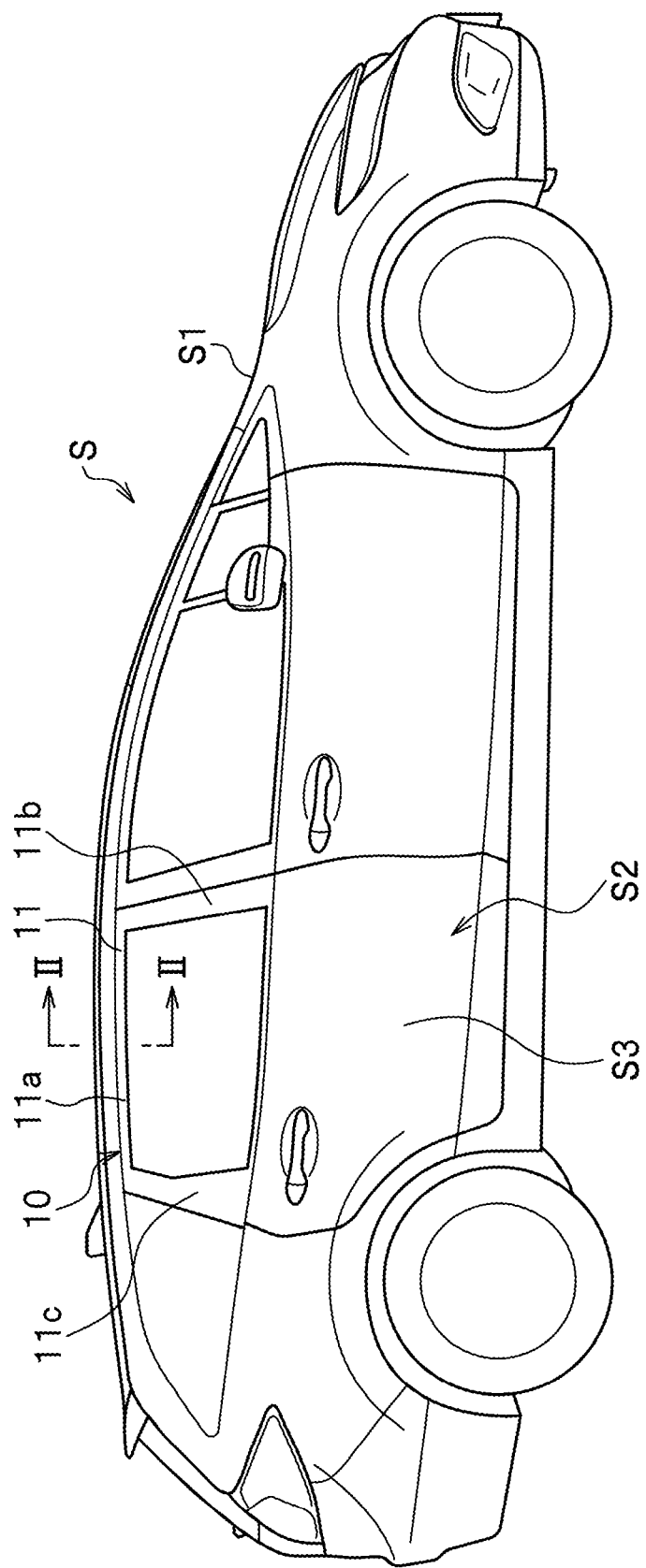
FIG. 1 is a side view showing a vehicle body in which a sash structure according to an embodiment is installed.

As illustrated in FIG. 1, a rear seat opening part through which an occupant gets into or out of the vehicle S is opened in a side surface rear of a vehicle body S1 of the vehicle S. A rear seat door S2 is installed in the rear seat opening part such that the rear seat door S2 is capable of opening and closing the rear seat opening part.

An upper half of the rear seat door S2 is assigned to a door window 10, while a lower half of the rear seat door S2 is assigned to a door main body S3.

The door window 10 includes a window frame 11, and a window glass 12 arranged inside the window frame 11 such that the window glass 12 is capable of coming up and down inside the window frame 11.

The sash structure 1 according to the embodiment forms the window frame 11 of the door window 10, and guides the ascending and descending of the window glass 12.

Regarding the sash structure 1 according to the embodiment, descriptions will be provided for an upper side part 11*a* of the window frame 11 in the rear seat door S2.

Figure 2:
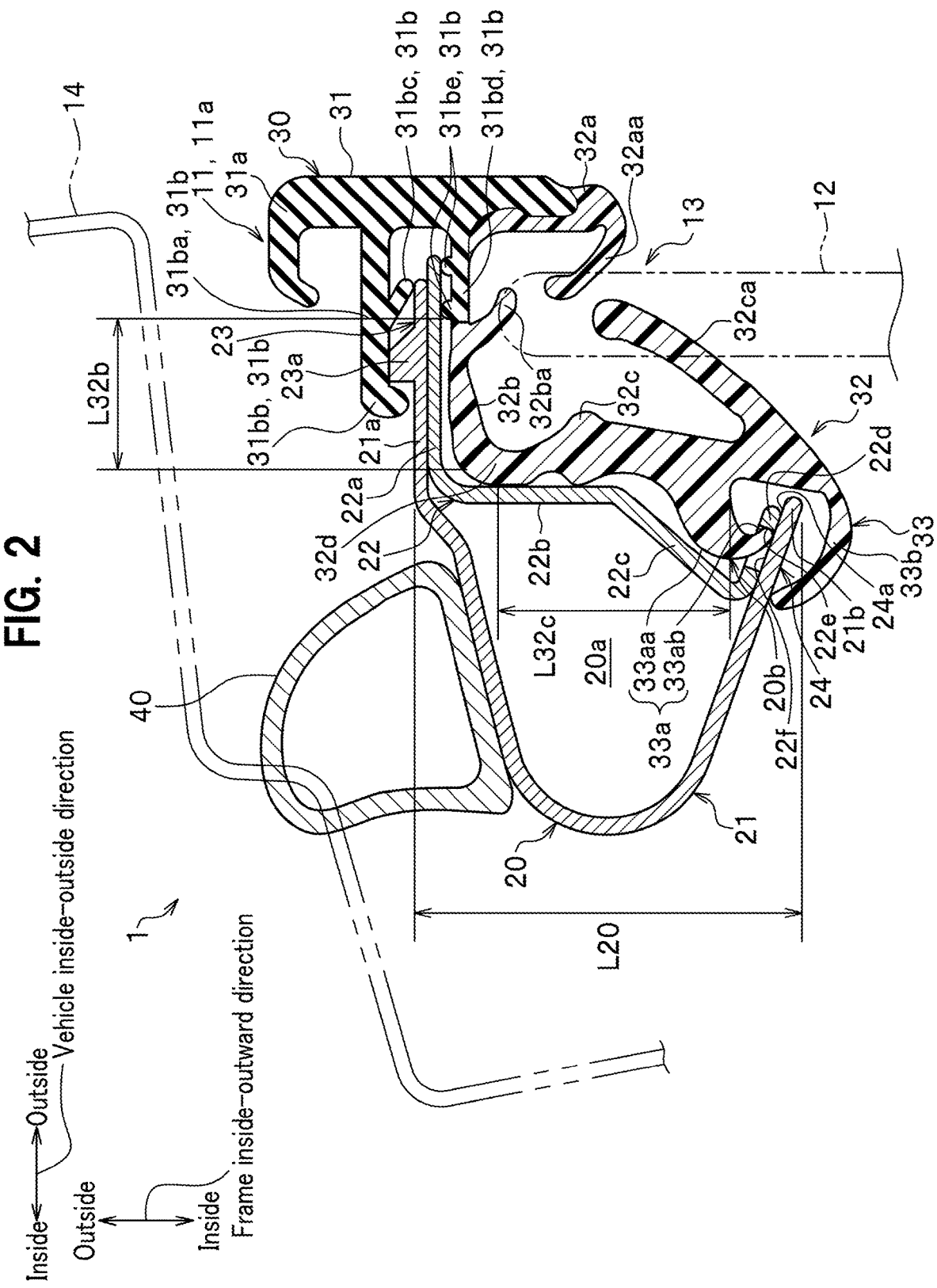
FIG. 2 is a cross-sectional view showing the sash structure according to the embodiment (with a mall assembly body already attached) taken along the II-II line of FIG. 1.

As illustrated in FIG. 2, the window frame 11 includes a window frame main body 20, a mall assembly body 30, and a door seal 40. The window frame 11 further includes a rail part 13 which is formed by the window frame main body 20 and the mall assembly body 30.

The rail part 13 is formed substantially in a U shape which is open toward an inside of the frame in a frame inside-outward direction. The rail part 13 surrounds the outer edge of the window glass 12, and guides the window glass 12 while the window glass is ascending and descending.

Incidentally, the frame inside-outside direction is a direction directing from the inside to the outside of the window frame 11. For example, in the upper side part 11a of the window frame illustrated in the embodiment, the frame inside-outside direction corresponds to a vehicle top-bottom direction; and in a front side part 11b and a rear side part 11c of the window frame 11, the frame inside-outward direction corresponds to a vehicle front-rear direction.

The window frame main body 20 includes a sash inner 21 and a sash outer 22. The sash inner 21 is formed from a plate-shaped member which is bent and curved substantially in a V form in its cross-sectional view. A V groove 20a formed inside the sash inner 21 is arranged such that the V groove 20a is open toward an outside of the vehicle in a vehicle inside-outside direction.

Incidentally, the vehicle inside-outside direction is a direction along a direction directing from the inside to outside of the vehicle S. For example, in the rear seat door S2 illustrated in the embodiment, the vehicle inside-outside direction corresponds to a vehicle width direction; in a tail gate (not illustrated) which opens and closes a vehicle rear portion, the frame inside-outward direction corresponds to the vehicle front-rear direction; and in a sunroof (not illustrated) which opens and closes a roof portion, the frame inside-outward direction corresponds to the vehicle top-bottom direction.

Furthermore, an opening edge of the V-shaped opening portion of the sash inner 21 which faces the outside of the frame in the frame inside-outside direction is assigned as an inner outside joining margin 21a, while an opening edge of the V-shaped opening portion of the sash inner 21 which faces the inside of the frame in the frame inside-outside direction is assigned as an inner inside joining margin 21b.

The sash outer 22 includes an outer outside joining margin 22a, a rail inner wall part 22b, a housing wall part 22c, and an outer inside joining margin 22d. The sash outer 22 is formed substantially in a W shape by bending a single flat plate-shaped member into sections corresponding to the four parts.

The outer outside joining margin 22a has a flat-plate shape, and is horizontally arranged extending in the vehicle inside-outside direction to form a part of an outer beam part 23, which will be described later.

The rail inner wall part 22b has a flat-plate shape, and extends along a plate surface of the window glass 12 from an end edge of the outer outside joining margin 22a which is closer to the inside of the vehicle in the vehicle inside-outside direction, and forms a part of an inner wall portion of the rail part 13. In other words, the window main body 20 forms a part of the inner wall of the rail part 13.

The housing wall part 22c has a flat-plate shape, and extends obliquely from a lower edge of the rail inner wall part 22b toward the inside in the vehicle inside-outside direction.

The outer inside joining margin 22d has a flat-plate shape, extends from an end edge of the housing wall part 22c which is closer to the inside of the frame in the frame inside-outside direction toward the outside of the vehicle in the vehicle inside-outside direction to form a part of an inner beam part 24. Furthermore, the outer inside joining margin 22d and the housing wall part 22c jointly form a housing recess part 20b substantially in a V shape in its cross-sectional view.

With the mall assembly body 30 attached to the window frame main body 20, the housing recess part 20b houses a guide lock part 33a, although described later.

Moreover, the outer inside joining margin 22d is provided with an engagement part 22e.

The engagement part 22e is formed from a hole edge of a rectangular hole 22f which is opened in the outer inside joining margin 22d.

Besides, the sash outer 22 is arranged inside the V groove 20a to close the V-shaped opening portion of the sash inner 21. The outer outside joining margin 22a and the inner outside joining margin 21a are joined together by joining means like spot welding, and their thus-joined portions are assigned as an inner beam part 23.

Furthermore, the outer inside joining margin 22d and the inner inside joining margin 21b are joined together by joining means like spot welding, and their thus-joined portions are assigned as an outer beam part 24.

In addition, the outer beam part 23 and the inner beam part 24 are arranged such that: the outer beam part 23 juts out from the window frame main body 20, and extends in the vehicle inside-outside direction from the inside to outside of the vehicle; and like the outer beam part 23, the inner beam part 24 juts out from the window frame main body 20, and extends in the vehicle inside-outside direction from the inside to outside of the vehicle. The outer beam part 23 and the inner beam part 24 are arranged such that an interval between the outer beam part 23 and the inner beam part 24 becomes slightly wider toward the outside in the frame inside-outside direction as the outer beam part 23 and the inner beam part 24 becomes toward their respective end edges. For example, in the embodiment, an angle formed between the outer beam part 23 and the inner beam part 24 is set at approximately 20 degrees.

As discussed above, the window frame main body 20 is formed from the sash outer 22 and the sash inner 21, and is formed substantially in an A shape in its cross-sectional view.

The outer beam part 23 has a cantilever beam shape which juts out from window frame main body 20 to enable a mall 31, although described later, to be attached to the outer beam part 23, and forms a part of a bottom portion of the rail part 13.

The outer beam part 23 further includes an outer beam engagement protrusion 23a on a surface of the outer beam part 23 which faces the outside of the frame in the frame inside-outside direction.

The outer beam engagement protrusion 23a is formed by cutting up a part of the inner outside joining margin 21a toward the outside of the frame in the frame inside-outside direction such that the part of the inner outside joining margin 21a is turned over from the inside to outside of the vehicle in the vehicle inside-outside direction.

Like the outer beam part 23, the inner beam part 24 has a cantilever beam shape which juts out from window frame main body 20.

In the inner beam part 24, the sash outer 22 and the sash inner 21 are overlapped and joined together in a way that make an end edge of the inner inside joining margin 21b project slightly further toward the outside of the vehicle in the vehicle inside-outside direction than an end edge of the outer inside joining margin 22d. In other words, an end edge of the inner beam part 24 has a stepped shape extending along a slope of the guide lock part 33a, although described later.

Moreover, the inner beam part 24 is set in a way that makes its end edge located closer to the inside of the vehicle in the vehicle inside-outside direction than the plate surface of the rail inner wall part 22b. In other words, the inner beam part 24 is formed in a way that does not allow its end edge to project into the rail part 13.

The mall assembly body 30 includes the mall 31 and a run channel 32, and is attached to the window frame main body 20 from the outside of the vehicle toward the inside of the vehicle in the vehicle inside-outside direction.

The mall 31 is formed from a flexible resin material, and includes a mall main body 31a and a mall attachment section 31b.

The mall 31 is attached to a distal end portion of the outer beam part 23 with the assistance of the mall attachment section 31b.

The mall main body 31a forms a part of an outer wall portion of the rail part 13. Furthermore, an outer surface of the mall main body 31a which faces the outside of the vehicle in the vehicle inside-outside direction forms a design unit for the window frame 11 and the vehicle S.

The mall attachment section 31b is arranged on an inner surface of the mall main body 31a which faces the inside of the vehicle in the vehicle inside-outside direction. The mall attachment section 31b includes a mall elastic beam 31ba, a mall lock claw 31bb, an elastic contact strip 31bc, a mall support beam 31bd, and support protrusions 31be.

The mall elastic beam 31ba and the mall support beam 31bd juts out from a surface of the mall main body 31a which faces the inside of the vehicle in the vehicle inside-outside direction, and extend in parallel to each other toward the inside of the vehicle in the vehicle inside-outside direction.

An interval between the mall elastic beam 31ba and the mall support beam 31bd is set at a dimension which is large enough to allow the outer beam part 23 to be inserted and fitted.

The mall elastic beam 31ba includes the mall lock claw 31bb on a distal end of the mall elastic beam 31ba, and the elastic contact strip 31bc on a surface of the mall elastic beam 31ba which faces the inside of the frame in the frame inside-outside direction (a surface which faces the mall support beam 31bd).

The mall lock claw 31bb has a hook claw shape which allows the mall lock claw 31bb to engage with the outer beam engagement protrusion 23a in a direction toward the outside of the vehicle in the vehicle inside-outside direction (in a direction in which the mall 31 comes off the outer beam part 23).

The elastic contact strip 31bc is flexible, and has a cantilever beam shape which juts out toward the inside of the frame in the frame inside-outside direction and toward the outside of the vehicle in the vehicle inside-outside direction.

The mall support beam 31bd includes the support protrusions 31be on a surface of the mall support beam 31bd which faces the outside of the frame in the frame inside-outside direction (a surface which faces the mall elastic beam 31ba), and the support protrusions are each formed from a ridge which is capable of coming into contact with the outer beam part 23.

This configuration of the mall attachment section 31b brings the distal end of the elastic contact strip 31bc into contact with a surface of the outer beam part 23 which faces the outside of the frame in the frame inside-outside direction, and bend when the mall 31 is attached to the outer beam part 23. Thus, a bending reaction force (resilience force) of the elastic contact strip 31bc biases the mall 31 toward the outside of the frame in the frame inside-outside direction, and the support protrusions 31be come into contact with the surface of the outer beam part 23 which faces the inside of the frame in the frame inside-outside direction. Thereby, the mall 31 is attached to the outer beam part 23 with play eliminated from the mall 31 in the frame inside-outside direction.

The run channel 32 is formed from a flexible and elastic elasticity material such as rubber, and is formed integrally with the mall 31 by joining or so on the run channel 32 and the mall 31 together during their curing. In other words, the mall 31 and the run channel 32 are formed into a single part.

When attached to the window frame 11, the run channel 32 is housed inside the rail part 13.

In addition, the run channel 32 includes an outer wall part 32a, a bottom part 32b and an inner wall part 32c. The run channel 32 is folded and housed inside the rail part 13 with the bottom part 32b and the inner wall part 32c arranged substantially in a straight line.

The outer wall part 32a is arranged integrally with a surface of the mall main body 31a which faces the inside of the vehicle in the vehicle inside-outside direction, extending in the frame inside-outside direction. With the run channel 32 attached to the window frame 11, the outer wall part 32a together with the mall main body 31a forms the outer wall portion of the rail part 13. In addition, the outer wall part 32a includes an outer wall elastic piece 32aa on a surface which faces the inside of the vehicle in the vehicle inside-outside direction.

The outer wall elastic piece 32aa is provided on an end edge of a vehicle inside-facing surface of the outer wall part 32a which is closer to the inside of the frame in the frame inside-outside direction, and extends toward the inside of the vehicle in the vehicle inside-outside direction, and toward the outside of the frame in the frame inside-outside direction. The outer wall elastic piece 32aa is in elastic contact with the surface of the ascending and descending window glass 12 which faces the outside of the vehicle in the vehicle inside-outside direction, and inhibits play of the window glass 12.

The bottom part 32b is arranged, integrally with the mall support beam 31bd, extending in the vehicle inside-outside direction. With the run channel 32 attached to the window frame 11, the bottom part 32b together with the outer beam part 23 forms the bottom portion of the rail part 13. The bottom part 32b includes a bottom elastic piece 32ba on a surface which faces the inside of the frame in the frame inside-outside direction.

The bottom elastic piece 32ba is provided on an end edge of the frame inside-facing surface which is closer to the inside of the vehicle in the vehicle inside-outside direction, and extends toward the outside of the vehicle in the vehicle inside-outside direction, and toward the inside of the frame in the frame inside-outside direction. The bottom elastic piece 32ba is in elastic contact with an end surface of the window glass 12 to support the window glass 12, while the window glass 12 is ascending and descending.

The inner wall part 32c is provided on and extends from an end edge of the bottom part 32b which is closer to the inside of the vehicle in the vehicle inside-outside direction. With the run channel 32 attached to the window frame 11, the inner wall part 32c together with the rail inner wall part 22b of the sash outer 22 forms an inner wall portion of the rail part 13.

In addition, a bent part 32d is provided in a joining portion between the inner wall part 32c and the bottom part 32b. When the run channel 32 is attached to the window frame 11, the run channel 32 is bent at the bent part 32d, and is accordingly installed along an inner surface of the rail part 13. Furthermore, the inner wall part 32c includes an inner wall elastic piece 32*ca* on a surface which faces the outside of the vehicle in the vehicle inside-outside direction.

The inner wall elastic piece 32*ca* is provided on an end edge of the surface which faces the outside of the vehicle in the vehicle inside-outside direction, the end edge closer to the inside of the frame in the frame inside-outside direction, and extends toward the outside of the vehicle in the vehicle inside-outside direction, and toward the outside of the frame in the frame inside-outside direction. While the window glass 12 is ascending and descending, the inner wall elastic piece 32*ca* is in elastic contact with a surface of the window glass 12 which faces the inside of the vehicle in the vehicle inside-outside direction, and thereby inhibits play of the window glass 12. Moreover, the inner wall elastic piece 32*ca* includes a retainer 33 on an opposite side of the inner wall elastic piece 32*ca* (a surface which faces the inside of the vehicle in the vehicle inside-outside direction).

The retainer 33 is configured to be capable of being locked to the inner beam part 24, and includes the guide lock part 33*a* and a lock lip 33*b*.

Figure 5:
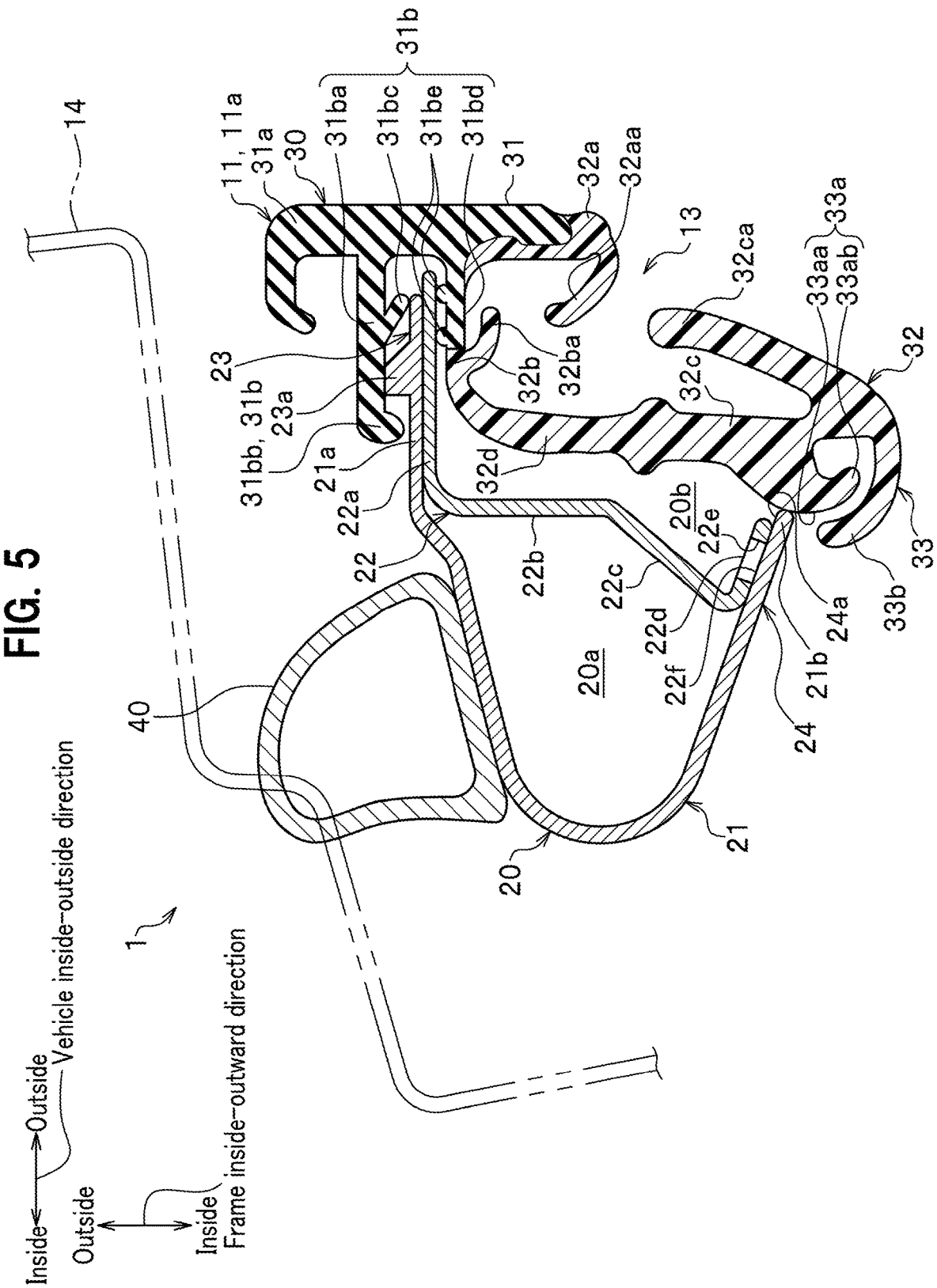
FIG. 5 is a cross-sectional view taken along the II-II line of FIG. 1, and showing how the mall of the mall assembly body is attached and temporarily fixed to the outer beam part.

The guide lock part 33*a* is arranged on a part of the run channel 32 which is opposed to a distal end edge 24*a* of the inner beam part 24 in the vehicle inside-outside direction when the mall 31 is attached and temporarily fixed to the outer beam part 23 (see FIG. 5). The guide lock part 33*a* is housed in the housing recess part 20*b* when the attachment of the mall 31 to the outer beam part 23 is completed (see FIG. 2). The guide lock part 33*a* includes a guide surface 33*aa* and a lock protrusion 33*ab*.

The guide surface 33*aa* is set at a position where the guide surface 33*aa* is brought into contact with a distal end edge of the inner beam part 24 by an attachment force which is inputted in the direction (the vehicle inside-outside direction) in which the mall 31 is attached to the run channel 32 with the mall 31 attached and temporarily fixed to the outer beam part 23 (see FIG. 5).

For the purpose of putting the guide surface 33*aa* and the inner beam part 24 in this positional relationship with the mall 31 temporarily fixed to the outer beam part 23, dimensions of the inner wall part 32*c*, the bottom part 32*b* and the window frame main body 20 are defined as follows. A total dimension of a dimension L32*c* of the inner wall part 32*c* in the frame inside-outside direction and a dimension L32*b* of the bottom part 32*b* in the vehicle inside-outside direction is set longer than a dimension L20 of the window frame main body 20 in the frame inside-outside direction (see FIG. 2).

The lock protrusion 33*ab* is formed from a protrusion which is formed substantially in a wedge shape in its cross-sectional view, and which is formed on a part of an end edge (outer edge) of the guide lock part 33*a* which is closer to the outside of the vehicle in the vehicle inside-outside direction. The lock protrusion 33*ab* is configured such that: its wedge-shaped distal end portion can fit into the rectangular hole 22*f* which is opened in the inner beam part 24, and which faces the outside of the frame in the frame inside-outside direction, and engages with the engagement part 22*e* toward the outside in the vehicle inside-outside direction.

After the attachment of the mall 31 is completed, the run channel 32 (the bent part 32*d*), as folded, has a resilience force with which the run channel 32 tries to the original straight line-like shape (see FIG. 2). This resilience force of the run channel 32 (the bent part 32*d*) biases the lock protrusion 33*ab* in a direction in which the lock protrusion 33*ab* gets caught by a plate surface of the inner beam part 24. This action more strongly locks the lock protrusion 33*ab* to the engagement part 22*e* provided in the inner beam part 24, and the attachment becomes more stable.

The lock lip 33*b* is flexible, and is formed substantially in a hook claw shape which curves from a base portion of the inner wall elastic piece 32*ca* toward the inside of the vehicle in the vehicle inside-outside direction.

The door seal 40 is arranged on a part of the sash inner 21 of the window frame main body 20 which faces a vehicle body panel 14. Furthermore, the door seal 40 is formed from a hollow cylindrical member by extrusion, the hollow cylindrical member having a substantially D-shaped cross-section, and projecting from the sash inner 21 toward the vehicle body panel 14. When the rear seat door S2 is closed, the door seal 40 is held between the sash inner 21 and the vehicle body panel 14, and thereby seals the interstice between the sash inner 21 and the vehicle body panel 14.

Next, descriptions will be provided for a sequence for attaching the mall assembly body 30.

Figure 3:
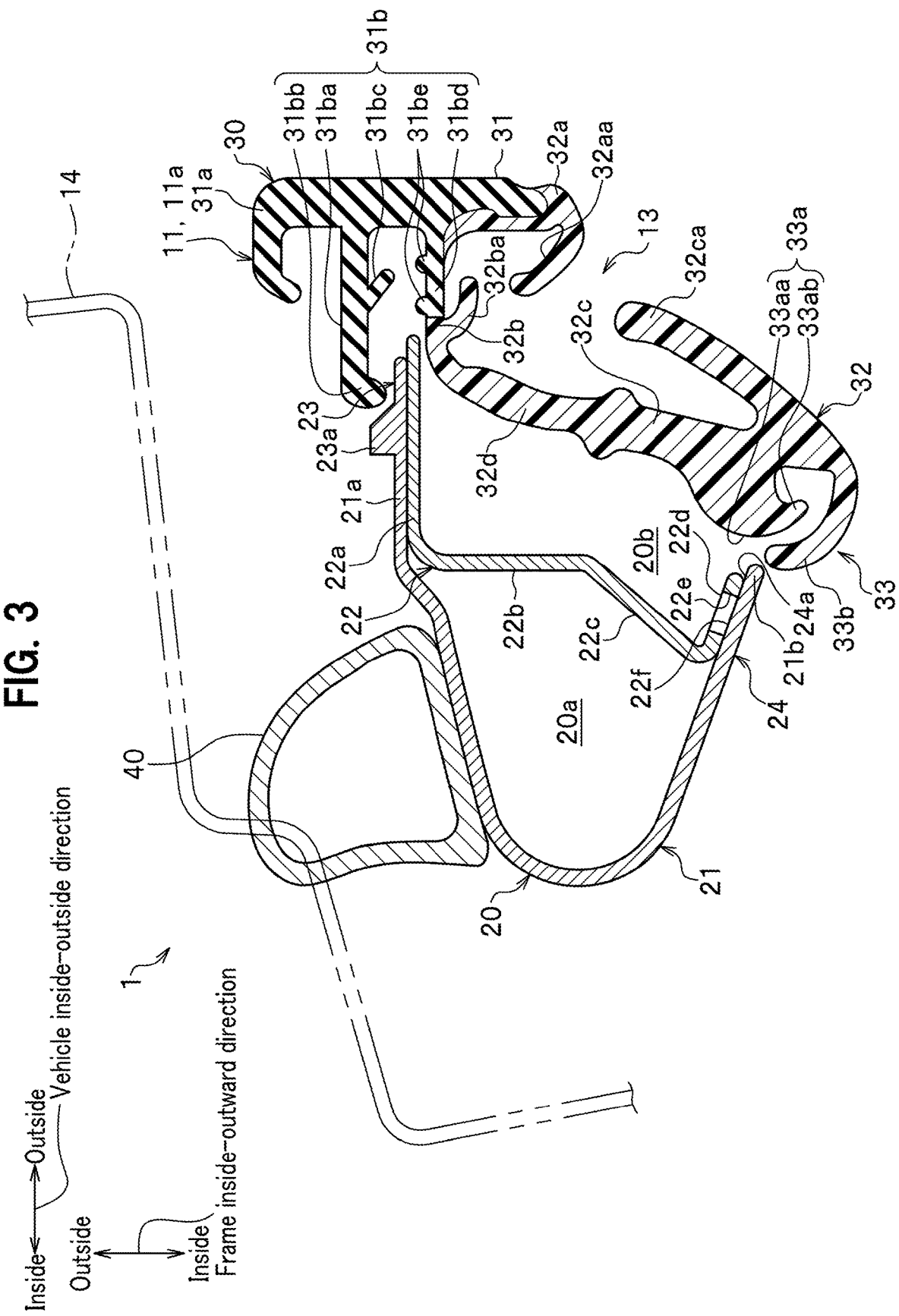
FIG. 3 is a cross-sectional view taken along II-II line of FIG. 1, and showing the sash structure in which the mall assembly body is about to be attached to a wind frame main body.

To begin with, as illustrated in FIG. 3, the mall assembly body 30 is placed outward of the window frame main body 20 in the vehicle inside-outside direction. Thereafter, the outer beam part 23 is inserted between the mall elastic beam 31*ba* and the mall support beam 31*bd*, and the mall main body 31*a* is pressed from the outside of the vehicle toward the inside of the vehicle in the vehicle inside-outside direction. Thereby, the mall lock claw 31*bb* goes onto the outer beam engagement protrusion 23*a* with the mall elastic beam 31*ba* getting bent.

Figure 4:
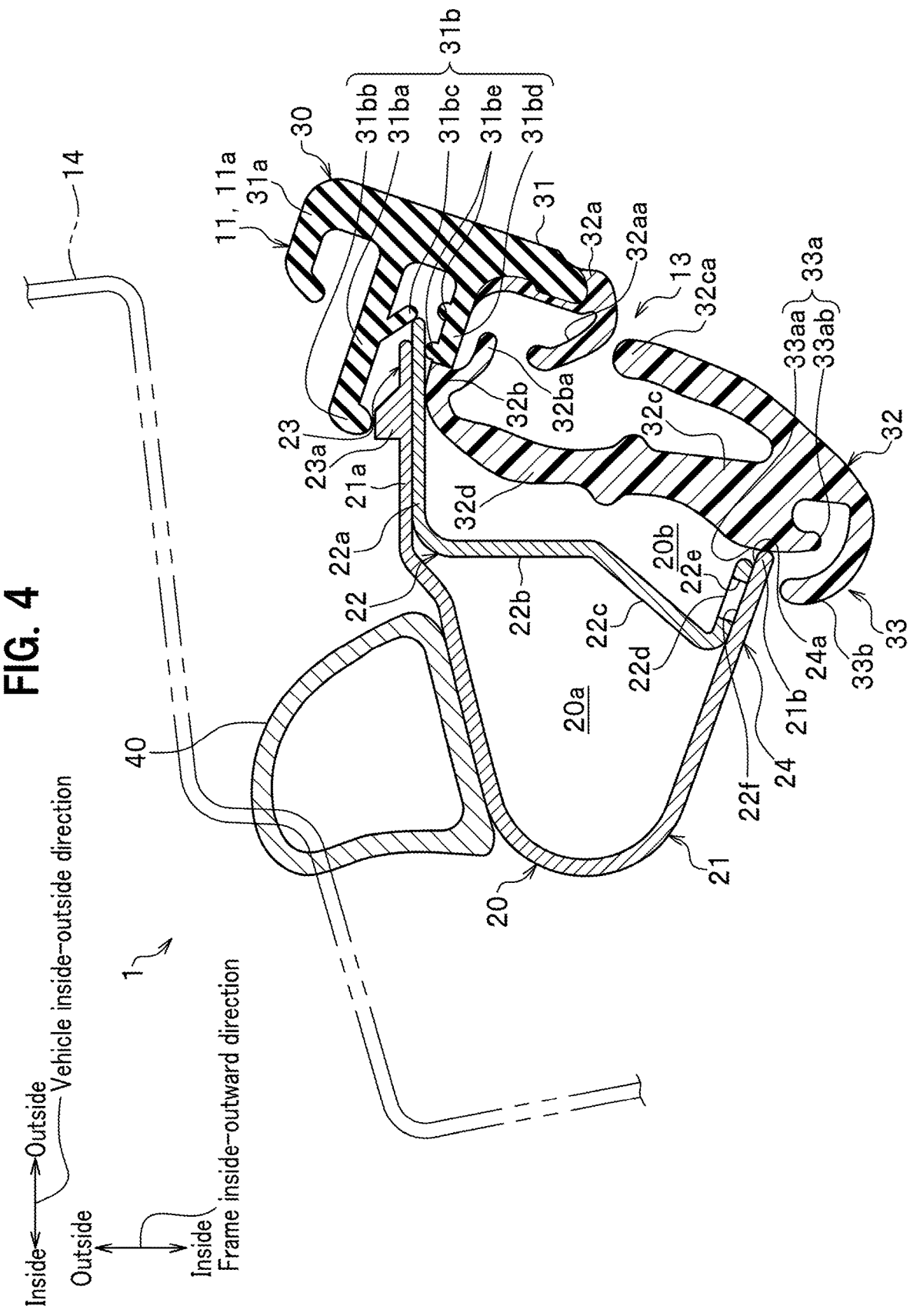
FIG. 4 is a cross-sectional view taken along II-II line of FIG. 1, and showing how to attach a mall of the mall assembly body to an outer beam part.

In a case where the upper side part 11*a*, the front side part and the rear side part of the mall 31 are made separately from each other, the mall 31 can be pressed while tilted, as illustrated in FIG. 4. In this case, the mall lock claw 31*bb* goes over the outer beam engagement protrusion 23*a* without getting bent.

In a case where the front side part 11*b*, the upper side part 11*a*, and the rear side part 11*c* are formed integrally, the mall 31 is brought over the outer beam engagement protrusion 23*a* by bending the mall elastic beam 31*ba* because the mall 31 can be tilted.

Next, as illustrated in FIG. 5, once the mall lock claw 31*bb* goes over the outer beam engagement protrusion 23*a* by the further pressing of the mall main body 31*a*, the mall elastic beam 31*ba* tries to return to its original shape due to its resilience force (bending reaction force). Thereby, the mall lock claw 31*bb* engages with the outer beam engagement protrusion 23*a*, and the mall 31 is thus attached to the outer beam part 23 (in the temporarily-fixed state).

While the mall 31 is attached to the outer beam part 23 (in the temporarily-fixed state), the distal end of the elastic contact strip 31*bc* is in contact with the surface of the outer beam part 23 which faces the outside of the frame in the frame inside-outside direction, and is bent. Accordingly, the bending reaction force (resilience force) of the elastic contact strip 31*bc* biases the mall 31 toward the outside of the frame in the frame inside-outside direction, and the support protrusion 31*be* comes into contact with the surface of the outer beam part 23 which faces the inside of the frame in the frame inside-outside direction. By this, the mall 31 is attached to the outer beam part 23 without play of the mall 31 in the frame inside-outside direction.

Meanwhile, while the mall 31 is attached and temporarily fixed to the outer beam part 23, in the upper side part of the window frame 11, the run channel 32 bends and hangs downward from the bottom part 32*b* due to its own weight, and the guide surface 33*aa* of the guide lock part 33*a* is opposed to the distal end of the inner beam part 24.

Figure 6:
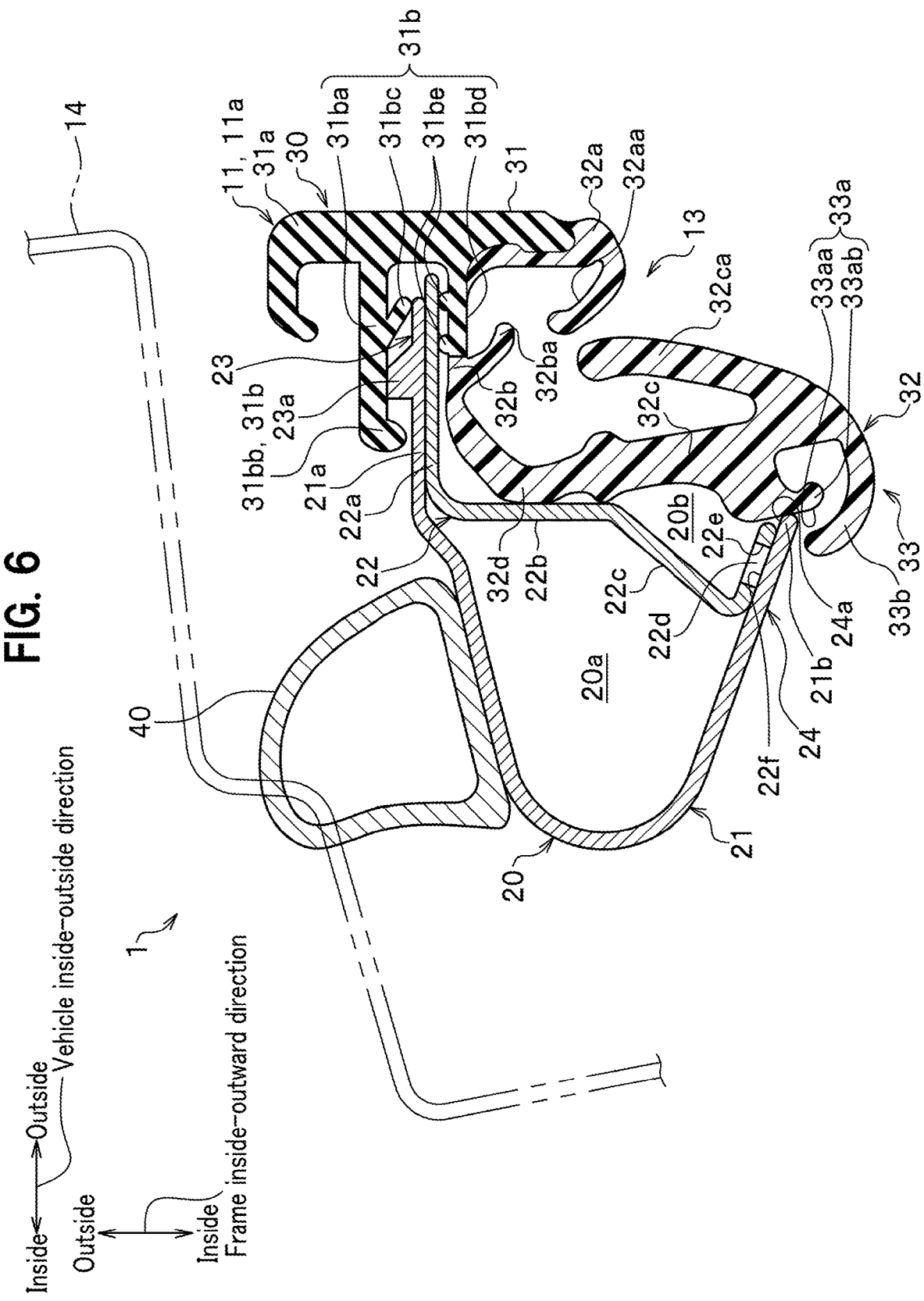
FIG. 6 is a cross-sectional view taken along the II-II line of FIG. 1, and showing how a guide surface comes into contact with an end edge of an inner beam part.

Next, as illustrated in FIG. 6, the run channel 32 is pressed in the same direction (the leftward direction in FIG. 6) as the mall 31 is attached. Thereby, the guide surface 33*aa* slides over the distal end of the inner beam part 24, and the inner wall part 32c moves toward the outside of the frame in the frame inside-outside direction while moving toward the inside of the vehicle in the vehicle inside-outside direction.

Figure 7:
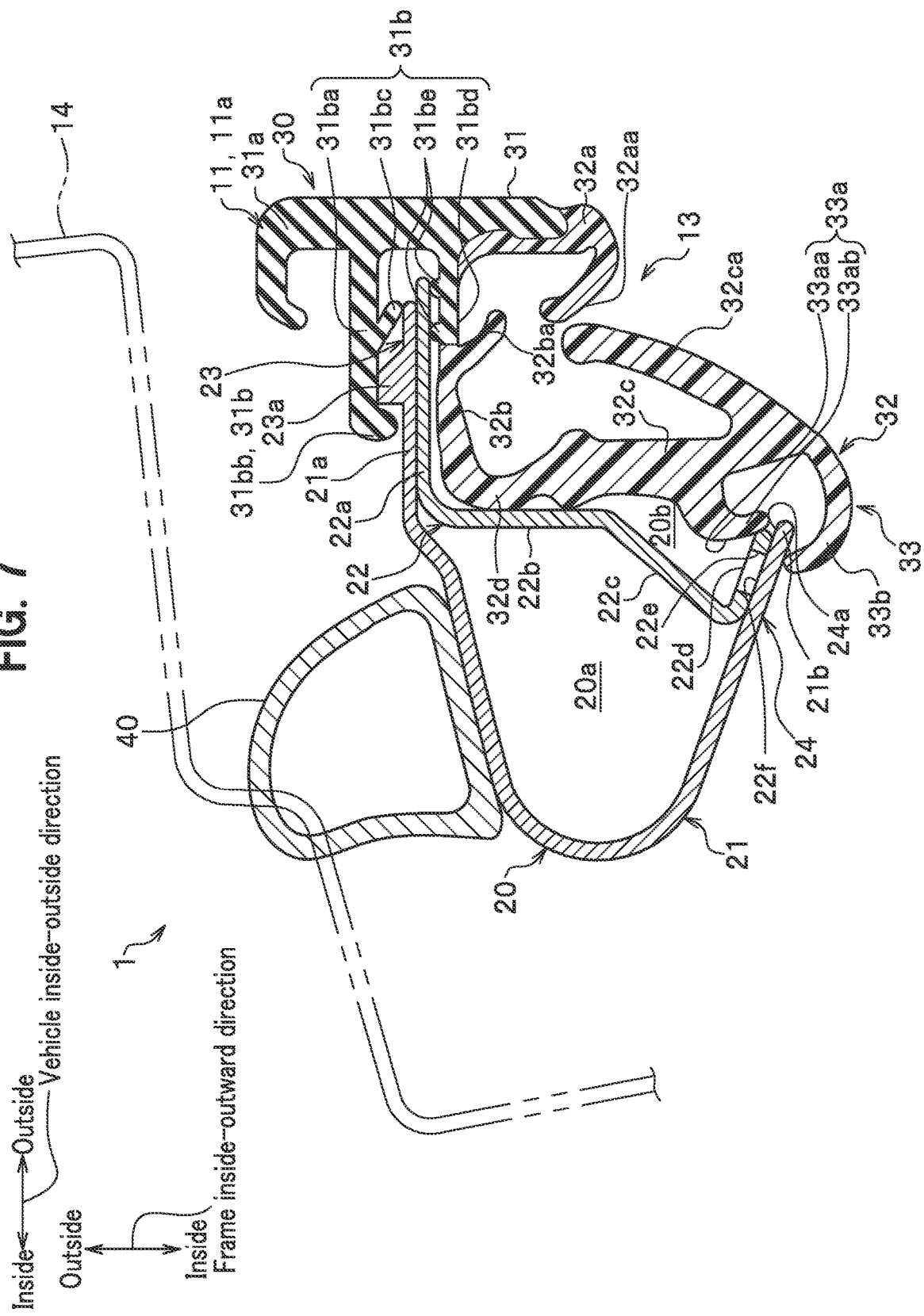
FIG. 7 is a cross-sectional view taken along the II-II line of FIG. 1, and showing how the guide surface slides over and goes onto the end edge of the inner beam part.

The run channel 32 is further pressed in the same direction. Thereby, the run channel 32 is folded at the bent part 32d, and the lock protrusion 33ab goes onto the surface of the inner beam part 24 which faces the outside of the frame in the frame inside-outside direction, as well as the lock lip 33b goes onto the surface of the inner beam part 24 which faces the inside of the frame in the frame inside-outside direction, as illustrated in FIG. 7.

Thereafter, the run channel 32 is further pressed in the same direction. Thereby, the guide lock part 33a is housed into the housing recess part 20b, and all the parts of the run channel 32 enter the rail part 13, as illustrated in FIG. 2.

The work of attaching the run channel 32 ends with the above.

Once the pressing of the run channel 32 is stopped (the inputting of the attachment force is stopped), the resilience force with which the bent part 32d tries to return to its original shape from the folded state presses the bottom part 32b toward the outside of the vehicle in the vehicle inside-outside direction, and toward the outside of the frame in the frame inside-outside direction. Thereby, the mall lock claw 31bb is pressed against, and thus engages with the outer beam engagement protrusion 23a, while the bottom part 32b is pressed against the surface of the outer beam part 23 which faces the inside of the frame in the frame inside-outside direction. In other words, the resilience force of the bent part 32d presses the mall 31 toward the outside of the vehicle to eliminate the play of the mall 31 in the vehicle inside-outside direction, while the resilience force of the elastic contact strip 31bc presses the mall 31 toward the outside of the frame to eliminate the play of the mall 31 in the frame inside-outside direction.

As discussed above, both the play in the vehicle inside-outside direction and the play in the frame inside-outside direction are eliminated. This inhibits strange noise from occurring due to the play of the mall 31 caused by opening or closing the door.

Furthermore, in the run channel 32, the resilience force of the bent part 32d presses the inner wall part 32c toward the inside of the vehicle in the vehicle inside-outside direction, and toward the inside of the frame in the frame inside-outside direction. Thereby, the guide lock part 33a is housed into the housing recess part 20b, while the lock protrusion 33ab is pressed against the surface of the inner beam part 24 which faces the outside of the frame in the frame inside-outside direction, and engages with and is held by the engagement part 22e.

As discussed above, the lock protrusion 33ab engages with the engagement part 22e, and the run channel 32 is held inside the rail part 13.

In the above-discussed way, the automobile door sash structure 1 according to the present invention makes it possible to attach the mall 31 and the run channel 32 by the single step of attaching the mall assembly body 30 to the window frame main body 20 from the outside of the vehicle toward the inside of the vehicle in the vehicle inside-outside direction. Thereby, the mall 31 and the run channel 32 can be attached to the window frame 11 by the simple work without needing many man-hours.

Furthermore, in the embodiment, the total dimension of the dimension L32c of the inner wall part 32c in the frame inside-outside direction and the dimension L32b of the bottom part 32b in the vehicle inside-outside direction is set longer than the dimension L20 of the window frame main body 20 in the frame inside-outside direction. This configuration makes it possible to make the guide surface 33aa of the guide lock part 33a opposed to the distal end of the inner beam part 24 with the mall 31 attached and temporarily fixed.

Thereby, the mall 31 and the run channel 32 can be correctly assembled together by only the action of pressing the run channel 32 in the same direction as the mall 31 is attached, while preventing a part of the run channel 32 from unexpectedly getting caught.

In the embodiment, the engagement part 22e with which the lock protrusion 33ab engages is formed from the hole edge in the rectangular hole 22f which is opened in the outer inside joining margin 22d included in the inner beam part 24. The configuration of the engagement part 22e like this make it possible to form the engagement part 22e by a relatively simple step of cutting the outer outside joining margin 22a.

This makes it possible to prevent the run channel 32 from coming off the rail part 13 without increasing the costs.

In the embodiment, the engagement part 22e is configured to engage with the lock protrusion 33ab extending outward in the vehicle inside-outside direction.

This makes it possible to prevent the run channel 32 from coming off the rail part 13 by the relatively simple work of engaging the lock protrusion 33ab with the engagement part 22e.

Although the sash structure 1 according to the embodiment guides the window glass 12 while the window glass 12 is coming up and down, the sash structure 1 is not limited to this configuration. For example, the sash structure 1 may be employed as a structure which supports the periphery of the window glass which is fittingly fixed to the structure.

Moreover, although the sash structure 1 according to the embodiment forms the upper side part 11a of the window frame 11, the sash structure 1 is not limited to that which forms the upper side part 11a. The sash structure 1 may be employed for the front side part 11b and the rear side part 11c of the window frame 11. Furthermore, the front side part 11b, the rear side part 11c and the upper side part 11a may be formed integrally.

Even in a case where the sash structure 1 according to the embodiment is employed additionally for the front side part 11b and the rear side part 11c of the window frame 11, the direction of the attachment from the outside to inside in the vehicle inside-outside direction is the same as the direction of the attachment in the embodiment in which the sash structure 1 is employed for the upper side part 11a. For this reason, the integral forming of the front side part 11b, the rear side part 11c and the upper side part 11a makes it possible to further enhance the attachment workability.

Besides, although the embodiment employs the lock structure in which the lock protrusion 33ab engages with the hole edge (the engagement part 22e) of the rectangular hole 22f which is opened in the inner beam part 24 and gets locked onto the plate surface, the lock structure is not limited to this configuration. The lock structure may employ, for example, a configuration in which the lock protrusion 33ab of the run channel 32 gets locked to a protrusion which is formed by cutting up or so a part of the inner beam part 24, as in the case of the outer beam engagement protrusion 23a of the outer beam part 23. This configuration brings about the same working and effects as the embodiment.

In addition, in the embodiment, the window frame main body 20 includes two members, that is to say, the sash inner 21 and the sash outer 22. The outer beam part 23 and the inner beam part 24 are formed by joining the joining margins 21a, 21b, 22a, 22d set in the end edges of the sash inner 21 and the sash outer 22. The window frame main body 20, however, is not limited to this mode.

For example, the window frame main body 20 may be formed from a single plate-shaped member. In this case, the inner beam part is formed by: folding the plate-shaped member; and overlapping the joining margins set respectively in the two end edges. Meanwhile, the outer beam part is formed by folding back the plate-shaped member by hemming or the like. The forming like this makes it possible to form a window frame main body having the same cross-sectional shape as the window frame main body 20 according to the embodiment.

Furthermore, in the embodiment, the outer beam part 23 and the inner beam part 24 have the configuration in which the interval between the outer beam part 23 and the inner beam part 24 becomes slightly wider toward the outside in the frame inside-outside direction as the interval becomes closer to the end edges of the outer beam part 23 and the inner beam part 24, but are not limited to having this configuration. The outer beam part 23 and the inner beam part 24 may have, for example, a configuration in which: the outer beam part 23 and the inner beam part 24 are arranged in parallel to each other; and the interval between the outer beam part 23 and the inner beam part is set constant. This configuration brings about the same working and effects as the embodiment.

What is claimed is:

1. An automobile door sash structure, comprising:
    a window glass arranged inside a window frame;
    a rail part forming a part of the window frame, and surrounding an outer edge of the window glass;
    a mall forming a part of an outer wall of the rail part;
    a window frame main body forming a part of an inner wall of the rail part;
    a run channel arranged inside the rail part;
    a mall assembly body including the mall and the run channel which are assembled into a single unit;
    an outer beam part having a cantilever beam shape which juts out from the window frame main body to enable the mall to be attached to the outer beam part; and
    an inner beam part having a cantilever beam shape which juts out upright from the window frame main body,
    wherein
    the run channel includes
        an inner wall part which forms the inner wall of the rail part in collaboration with the window frame main body, and
        a bottom part which forms a bottom portion of the rail part in collaboration with the window frame main body,
    a total dimension of a dimension of the inner wall part in a frame inside-outside direction and a dimension of the bottom part in a vehicle inside-outside direction is set longer than a dimension of the window frame main body in the frame inside-outside direction, and
    the inner beam part includes an engagement part which is engageable with a lock protrusion included in the run channel.

2. The automobile door sash structure according to claim 1, wherein the engagement part engages with the lock protrusion extending outward in the vehicle inside-outside direction.

* * * * *